US012660053B2

(12) United States Patent
Lu et al.

(10) Patent No.: US 12,660,053 B2
(45) Date of Patent: Jun. 16, 2026

(54) LIGHTING DEVICE WITH ADAPTIVE OUTPUT POWER CONTROL FUNCTION

(71) Applicant: Xiamen PVTECH Co., Ltd., Xiamen (CN)

(72) Inventors: Fuxing Lu, Xiamen (CN); Zhirong Lin, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 38 days.

(21) Appl. No.: 18/963,463

(22) Filed: Nov. 27, 2024

(65) Prior Publication Data

US 2025/0185131 A1 Jun. 5, 2025

(30) Foreign Application Priority Data

Dec. 1, 2023 (CN) ......................... 202311649009.0

(51) Int. Cl.

*H05B 45/14* (2020.01)
*H05B 45/325* (2020.01)
*H05B 45/355* (2020.01)
*H05B 45/375* (2020.01)
*H05B 45/38* (2020.01)
*H05B 47/105* (2020.01)

(52) U.S. Cl.

CPC ........... *H05B 45/14* (2020.01); *H05B 45/325* (2020.01); *H05B 45/355* (2020.01); *H05B 45/375* (2020.01); *H05B 45/38* (2020.01)

(58) Field of Classification Search

CPC ...... H05B 45/14; H05B 45/325; H05B 45/38; H05B 45/355; H05B 45/375

See application file for complete search history.

(56) References Cited

U.S. PATENT DOCUMENTS

2010/0026208 A1 2/2010 Shteynberg et al.

FOREIGN PATENT DOCUMENTS

| | | | | |
|---|---|---|---|---|
| CA | 2799412 | A1 * | 12/2011 | ........... H05B 39/044 |
| CN | 103987162 | A | 8/2014 | |
| JP | 2013089286 | A | 5/2013 | |
| JP | 2014086363 | A | 5/2014 | |
| JP | 2018137129 | A | 8/2018 | |
| TW | 202107936 | A | 2/2021 | |

* cited by examiner

*Primary Examiner* — Henry Luong

(74) *Attorney, Agent, or Firm* — BruceStone LLP; Joseph A. Bruce

(57) ABSTRACT

A lighting device includes a dimming module, a control module, a rectifier module and a light-emitting module. The control module is connected to the dimming module and saves a lookup table. The rectifier module is connected to the dimming module and control module. The rectifier module generates a rectified voltage to drive the dimming module and control module. The light-emitting module is connected to the dimming module and control module. The control module outputs an initial dimming signal to control the dimming module to output an initial drive signal so as to drive the light-emitting module. The control module detects the current operating voltage of the light-emitting module, and compares the current operating voltage with the lookup table to generate a target dimming signal corresponding thereto, such that the dimming module is controlled by the target dimming signal to generate a target driving signal to drive the light-emitting module.

10 Claims, 6 Drawing Sheets

LIGHTING DEVICE WITH ADAPTIVE OUTPUT POWER CONTROL FUNCTION

BACKGROUND OF THE INVENTION

1. Field of the Invention

The present invention relates to a lighting device, in particular to a lighting device with adaptive output power control function.

2. Description of the Prior Art

Currently available LED lighting device power supplies mainly include constant voltage sources and constant current sources. However, these two types of power supplies can lead to a range of issues in practical applications. When the power supply for a lighting device is a constant current source and the voltage of the LED (load) in the lighting device changes, the output power of the lighting device may also vary, which can lead to overload and potential device failure. Additionally, due to manufacturing tolerances, LEDs of the same model may have different power ratings, which could also result in the aforementioned issues. When the power supply for a lighting device is a constant voltage source and the LED (load) voltage varies significantly, which may cause the LED to fail to start or to experience overcurrent conditions, potentially leading to device failure.

The China Patent Publication No.: CN103874296A and China Patent No.: CN206077764U also disclose circuit designs for lighting devices but still do not effectively address the above issues.

SUMMARY OF THE INVENTION

One embodiment of the present invention provides a lighting device with adaptive output power control function, which includes a dimming module, a control module, a rectifier module and a light-emitting module. The control module is connected to the dimming module and saves a lookup table. The rectifier module is connected to the dimming module and the control module, and the rectifier module generates a rectified voltage to drive the dimming module and the control module. The light-emitting module is connected to the dimming module and the control module. The control module outputs an initial dimming signal to control the dimming module to output an initial drive signal so as to drive the light-emitting module. The control module detects the current operating voltage of the light-emitting module, and compares the current operating voltage with the lookup table to generate a target dimming signal corresponding thereto, such that the dimming module is controlled by the target dimming signal to generate a target driving signal to drive the light-emitting module.

In one embodiment, the dimming module comprises an output voltage extraction unit. The output voltage extraction unit converts an output voltage of the dimming module into a reference voltage based on a preset conversion ratio.

In one embodiment, the lighting device further includes a load voltage detection module. The load voltage detection module receives the reference voltage and transmits the reference voltage to the control module.

In one embodiment, the control module includes a voltage detection unit. The voltage detection unit receives the reference voltage and converts the reference voltage into a feedback signal based on a preset voltage division ratio. The control module compares the feedback signal with the lookup table to estimate the output voltage of the dimming module and generate an estimated voltage, and generates the target dimming signal according to the estimated voltage in order to make the output power of the light-emitting module be constant.

In one embodiment, the lookup table records the preset conversion ratio and the preset voltage division ratio.

In one embodiment, the output voltage extraction unit is a transformer.

In one embodiment, the control module periodically generates the target dimming signal to control the dimming module to generate the target driving signal so as to drive the light-emitting module.

In one embodiment, the lighting device further includes a filter module. The filter module is connected to an external power source and the rectifier module.

In one embodiment, the lighting device further includes a power factor correction module. The rectifier module is connected to the dimming module via the power factor correction module.

In one embodiment, the lighting device further includes a power supply module. The rectifier module is connected to the control module via the power supply module.

The lighting device with adaptive output power control function in accordance with the embodiments of the present invention may have the following advantages:

(1) According to one embodiment of the present invention, the lighting device includes a dimming module, a control module, a rectifier module and a light-emitting module. The control module is connected to the dimming module and saves a lookup table. The rectifier module is connected to the dimming module and the control module, and the rectifier module generates a rectified voltage to drive the dimming module and the control module. The light-emitting module is connected to the dimming module and the control module. The control module outputs an initial dimming signal to control the dimming module to output an initial drive signal so as to drive the light-emitting module. The control module detects the current operating voltage of the light-emitting module, and compares the current operating voltage with the lookup table to generate a target dimming signal corresponding thereto, such that the dimming module is controlled by the target dimming signal to generate a target driving signal to drive the light-emitting module. In this way, the output power of the light-emitting module can be constant. Via the adaptive output power control function, the control module can quickly and accurately estimate the current operating voltage (load voltage) of the light-emitting module and convert the current operating voltage into the target dimming signal via the lookup table to appropriately adjust the dimming module's dimming signal. In this way, the output power of the light-emitting module can remain constant in order to prevent overloads or faults in the lighting device. Thus, the reliability of the lighting device can be significantly improved to meet actual needs.

(2) According to one embodiment of the present invention, the lighting device has the adaptive output power control function to maintain a constant output power in the dimming module. Therefore, even when the voltage of the light-emitting module (load) in the lighting device varies greatly, the adaptive output power control function can still keep the output power of the light-emitting module constant, ensuring that the light-emitting module can operate and effectively prevent overcurrent conditions. This further enhances the reliability of the lighting device to meet actual needs.

(3) According to one embodiment of the present invention, the lighting device includes a load voltage detection module. The control module includes a voltage detection unit, while the dimming module includes an output voltage extraction unit. The output voltage extraction unit converts the output voltage of the dimming module into a reference voltage based on a preset conversion ratio. The load voltage detection module receives the reference voltage and transmits the reference voltage to the control module, while the voltage detection unit receives the reference voltage and converts the reference voltage into a feedback signal according to a preset voltage division ratio. In this way, the control module can quickly compare the feedback signal with the lookup table to accurately estimate the output voltage of the dimming module and generate an estimated voltage. Finally, the control module can directly use the lookup table to find the target dimming signal corresponding to the estimated voltage, adjusting the output signal of the dimming module to generate the target driving signal. This specialized load voltage detection mechanism is compatible with different loads and can quickly and efficiently detect load voltage, such that the output current of the dimming module can vary with the estimated voltage. Therefore, the output power of the light-emitting module can remain constant.

(4) According to one embodiment of the present invention, the control module can generate the target dimming signal by smoothly adjusting the duty cycle. This control mechanism effectively prevents damage to the light-emitting module caused by rapid voltage changes, thus extending the service life of the light-emitting module and meeting environmental protection requirements.

(5) According to one embodiment of the present invention, the lighting device has the adaptive output power control function to maintain a constant output power in the dimming module. Therefore, even if the light-emitting module's electrical characteristics deviate from the specified parameters due to manufacturing variations, the adaptive output power control function can still keep the output power of the light-emitting module within the specified parameters. This effectively optimizes the performance of the lighting device.

(6) According to one embodiment of the present invention, the circuit design of the lighting device is simple, such that the lighting device can achieve the desired technical effects without significantly increasing costs. Thus, the practicality of the lighting device is effectively improved to meet the needs of different applications.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
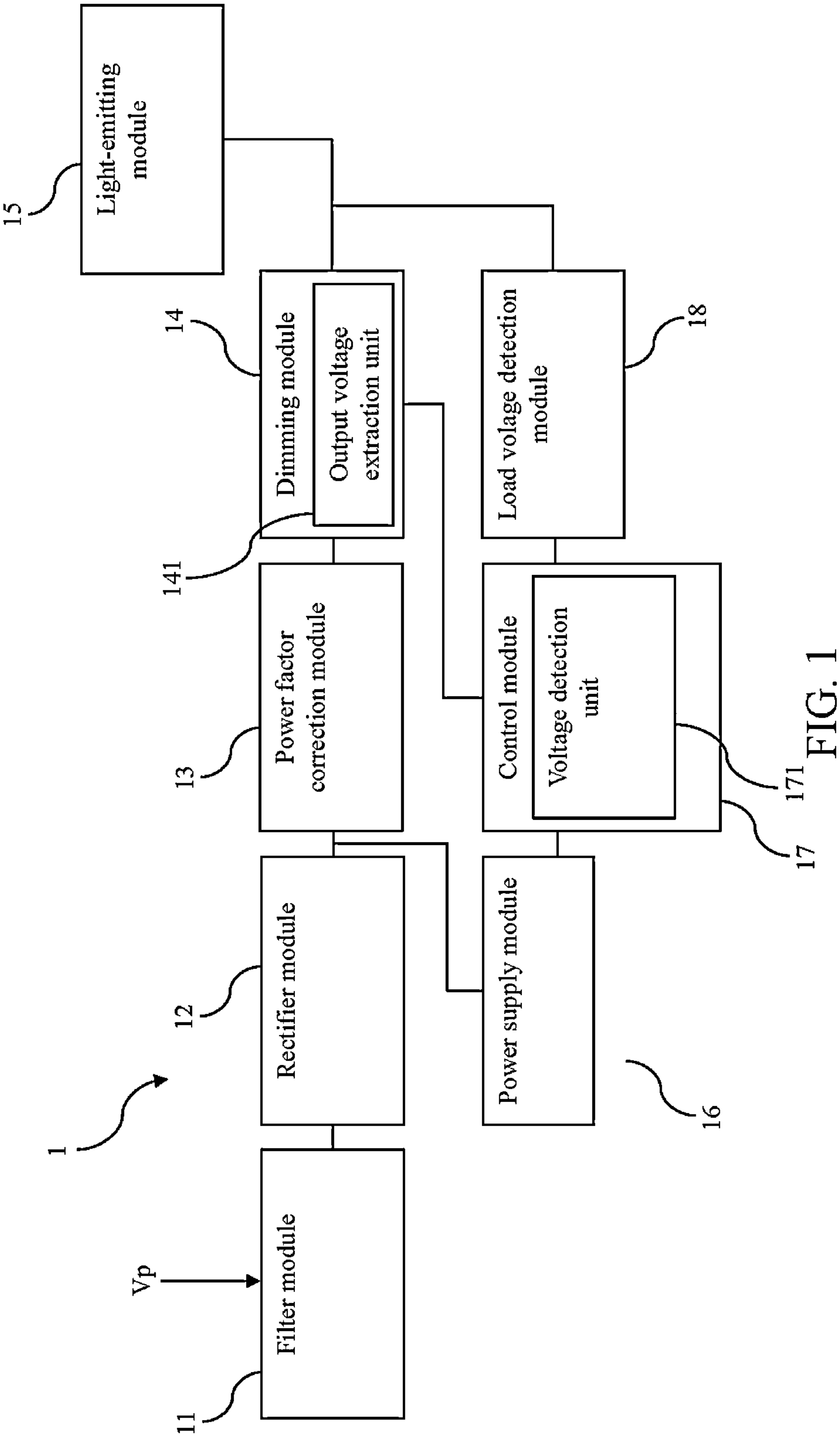
FIG. 1 is the block diagram of the lighting device with adaptive output power control function in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the block diagram of the lighting device with adaptive output power control function in accordance with the first embodiment of the present invention. As shown in FIG. 1, the lighting device 1 includes a filter module 11, a rectifier module 12, a power factor correction module 13, a dimming module 14, a light-emitting module 15, a power supply module 16, a control module 17, and a load voltage detection module 18.

The filter module 11 is connected to an external power source and receives an input voltage Vp from the external power source to generate a filtered voltage. In one embodiment, the filter module 11 may include one or more of a filtering circuit, an electromagnetic interference (EMI) circuit, a thermistor, and a varistor. The circuit structure of the filter module 11 should be well-known to those skilled in the art, and thus, will not be further elaborated here.

The rectifier module 12 is connected to the filter module 11 and receives the filtered voltage to generate a rectified voltage. In one embodiment, the rectifier module 12 may be a full-wave rectifier. In another embodiment, the rectifier module 12 may also be a half-wave rectifier or other similar components. The circuit structure of the rectifier module 12 should be well-known to those skilled in the art and will not be further elaborated here.

The power factor correction module 13 is connected to the rectifier module 12 and receives the rectified voltage to generate a corrected voltage. In one embodiment, the power factor correction module 13 may be an active power factor correction (Active PFC) circuit. In another embodiment, the power factor correction module 13 may be a passive power factor correction (Passive PFC) circuit, a dynamic power factor correction (Dynamic PFC) circuit, or other similar components. The circuit structure of the power factor correction module 13 should be well-known to those skilled in the art and will not be further elaborated here.

The dimming module 14 includes an output voltage extraction unit 141. The dimming module 14 is connected to the power factor correction module 13, such that the power factor correction module 13 can power the dimming module 14. In one embodiment, the dimming module 14 may be a DC/DC dimming circuit or other currently available LED dimming circuits. The circuit structure of the dimming module 14 should be well-known to those skilled in the art and will not be further elaborated here. The difference between the dimming module and currently available dimming circuits is that the dimming module 14 includes an output voltage extraction unit 141. In one embodiment, the output voltage extraction unit 141 may be a transformer. In another embodiment, the output voltage extraction unit 141 may be a voltage divider circuit including multiple resistors or other similar circuits.

The light-emitting module 15 is connected to the dimming module 14. In one embodiment, the light-emitting module 15 may be a light-emitting diode (LED). In another embodiment, the light-emitting module 15 may be an LED array.

The control module 17 includes a voltage detection unit 171 and saves a lookup table. The control module 17 is connected to the rectifier module 12 via the power supply module 16. The power supply module 16 receives the rectified voltage to generate a driving voltage so as to power the control module 17. In one embodiment, the control module 17 may be a microcontroller (MCU). In another embodiment, the control module 17 may be a central-processing unit (CPU), an application-specific integrated circuit (ASIC), a field-programmable gate array (FPGA), or other similar components. In one embodiment, the power supply module 16 may be a buck converter. In another embodiment, the power supply module 16 may be a boost converter, a buck-boost converter, or other similar components.

The load voltage detection module 18 is disposed between the light-emitting module 15 and the control module 17. The control module 17 is connected to the light-emitting module 15 via the load voltage detection module 18.

The control module 17 outputs an initial dimming signal to control the dimming module 14 to enter an operating state. Then, the dimming module 14 outputs an initial driving signal to drive the light-emitting module 15 and detects the current operating voltage of the light-emitting module 15. The control module 17 then compares the current operating voltage with the lookup table to generate a target dimming signal corresponding to the current operating voltage, which controls the dimming module 14 to generate a target driving signal so as to drive the light-emitting module 15. Through the above circuit structure, the control module 17 can perform a special adaptive output power control function.

The embodiment just exemplifies the present invention and is not intended to limit the scope of the present invention; any equivalent modification and variation according to the spirit of the present invention is to be also included within the scope of the following claims and their equivalents.

Figure 2:
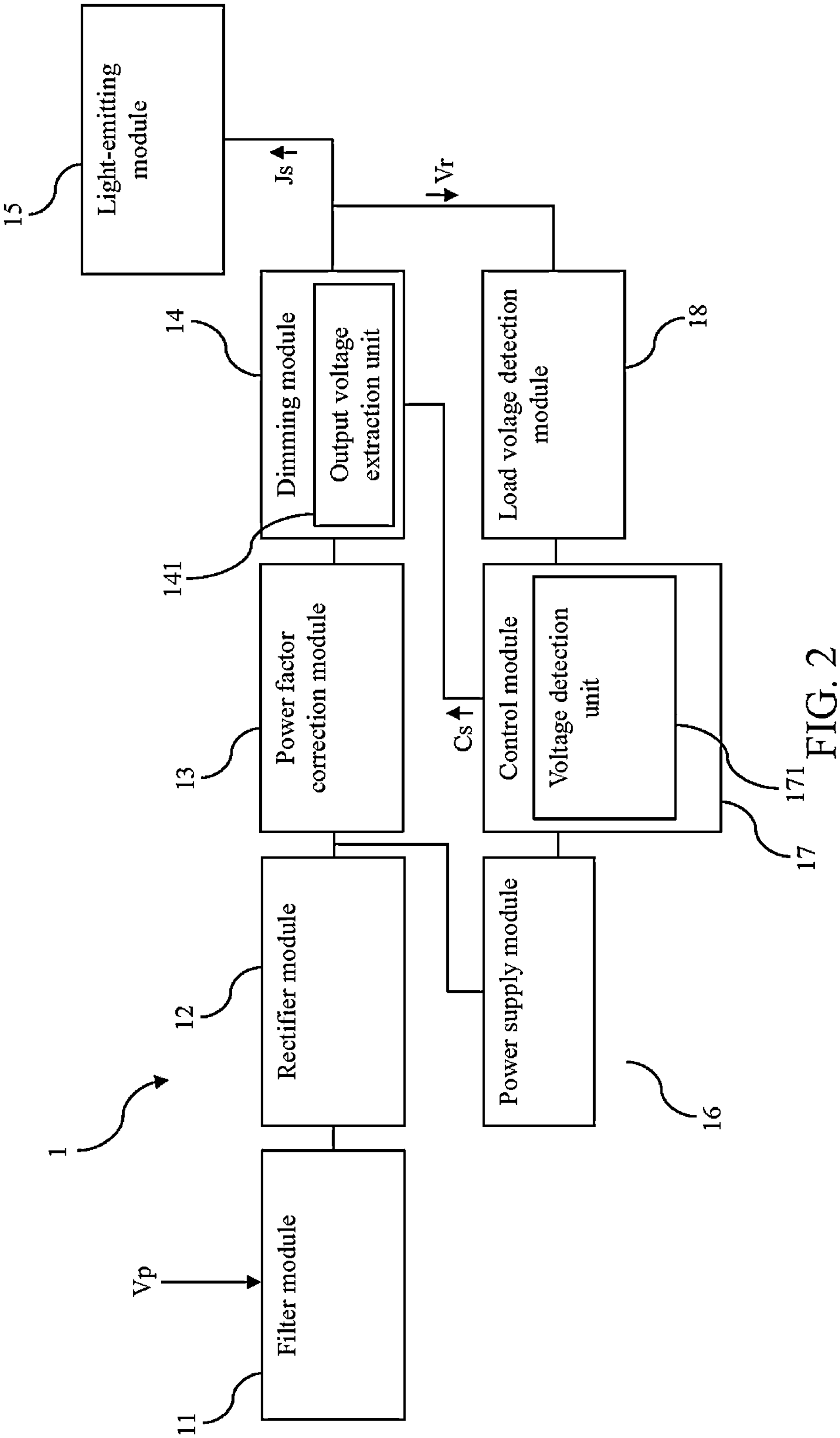
FIG. 2 is the first schematic view of the operating state of the lighting device with adaptive output power control function in accordance with the first embodiment of the present invention.
Figure 3:
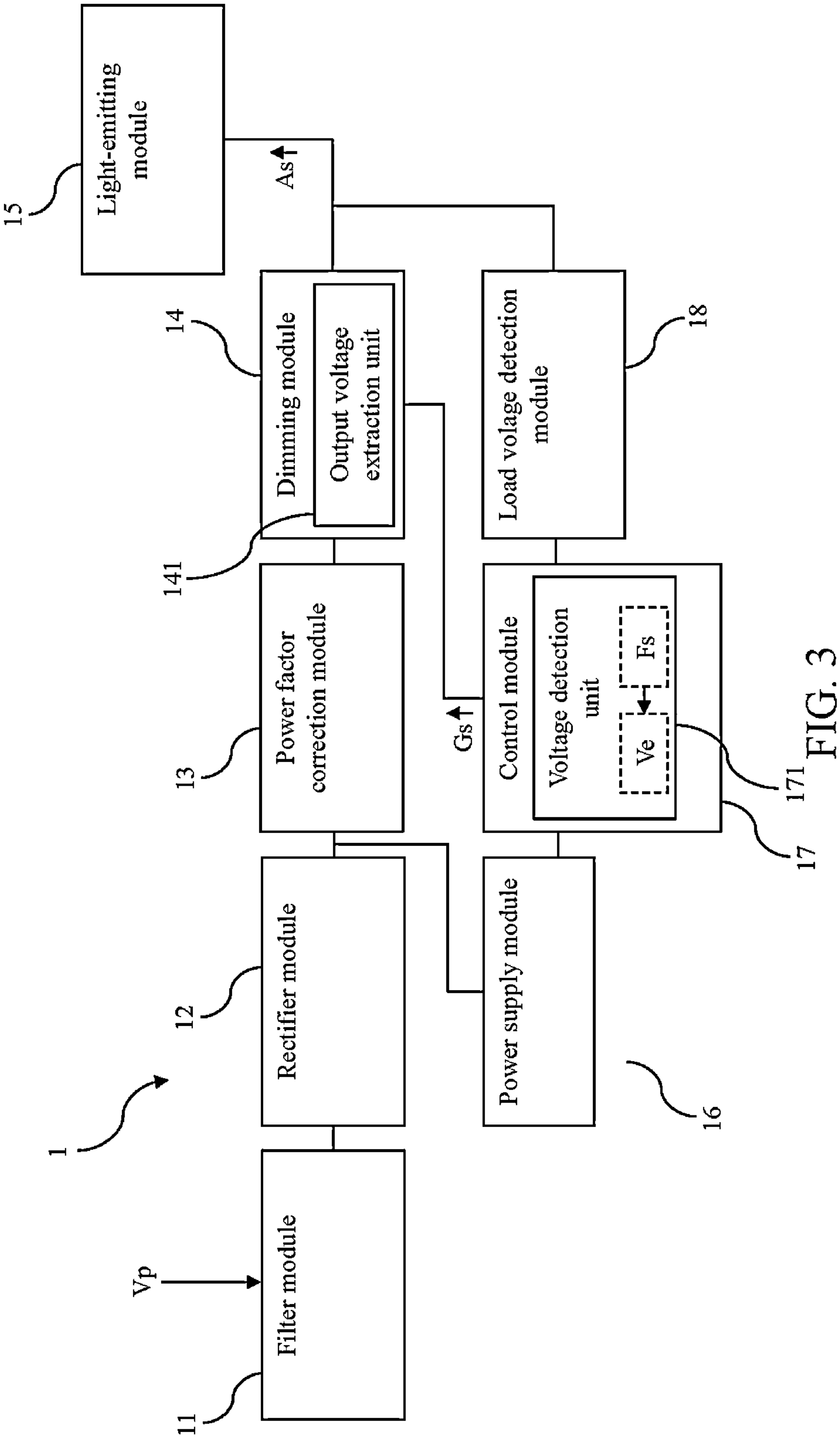
FIG. 3 is the second schematic view of the operating state of the lighting device with adaptive output power control function in accordance with the first embodiment of the present invention.

Please refer to FIG. 2 and FIG. 3. FIG. 2 is the first schematic view of the operating state of the lighting device with adaptive output power control function in accordance with the first embodiment of the present invention. FIG. 3 is the second schematic view of the operating state of the lighting device with adaptive output power control function in accordance with the first embodiment of the present invention. As shown in FIG. 2, the control module 17 may output a minimum initial dimming signal Cs to control the dimming module 14 to enter the operating state. Next, the dimming module 14 may output an initial driving signal Js to drive the light-emitting module 15. The initial dimming signal Cs may be a pulse width modulation (PWM) signal.

Then, the output voltage extraction unit 141 of the dimming module 14 converts the output voltage of the dimming module 14 to a reference voltage Vr based on a preset conversion ratio.

Next, the load voltage detection module 18 receives the reference voltage Vr and transmits the reference voltage Vr to the control module 17. The voltage detection unit 171 of the control module 17 receives the reference voltage Vr.

As shown in FIG. 3, the voltage detection unit 171 converts the reference voltage Vr into a feedback signal Fs according to a preset voltage division ratio. The control module 17 compares the feedback signal Fs with the lookup table to estimate the output voltage of the dimming module 14 and generates an estimated voltage Ve. Based on the estimated voltage Ve, the control module 17 generates a target dimming signal Gs. The target dimming signal Gs may be a pulse width modulation (PWM) signal.

The control module 17 then transmits the target dimming signal Gs to the dimming module 14, which can control the dimming module 14 to generate a target driving signal As so as to drive the light-emitting module 15. Through this mechanism, the control module 17 can quickly and accurately estimate the current operating voltage (load voltage) of the light-emitting module 15. Using the lookup table, the control module 17 converts this voltage into the target dimming signal Gs to appropriately adjust the dimming signal of the dimming module 14. In this way, the output power of the light-emitting module 15 can be kept constant.

Furthermore, the control module 17 can generate the target dimming signal Gs by smoothly adjusting the duty cycle. This control mechanism effectively prevents damage to the light-emitting module 15 from the impact of rapid voltage changes, thus preventing damage to the light-emitting module 15. Consequently, the service life of the lighting device 1 can be effectively extended with a view to meeting environmental protection requirements.

Additionally, the control module 17 can periodically generate the target dimming signal Gs to control the dimming module 14 in order to generate the target driving signal! As for driving the light-emitting module 15. This control mechanism ensures that the output power of the light-emitting module 15 remains constant at all times.

The lookup table records the preset conversion ratio and preset voltage division ratio, allowing the control module 17 to calculate the estimated voltage Ve based on these ratios.

This enables the estimated voltage Ve to closely approximate the actual output voltage of the dimming module 14. Moreover, the lookup table can also record control signals corresponding to different estimated voltages (these control signals can regulate the dimming module 14 to generate output currents corresponding to various estimated voltages). Therefore, the control module 17 can compare the estimated voltage Ve with the lookup table to find the duty cycle of the control signal corresponding to the estimated voltage Ve so as to generate the target dimming signal Gs. The control module 17 then uses the target dimming signal Gs to control the dimming module 14, such that the dimming module 14 can generate the corresponding target driving signal As. Consequently, the output current of the dimming module 14 can match the output voltage, maintaining a constant output power for the light-emitting module 15.

The embodiment just exemplifies the present invention and is not intended to limit the scope of the present invention; any equivalent modification and variation according to the spirit of the present invention is to be also included within the scope of the following claims and their equivalents.

It is worthy to point out that when the power supply for a lighting device is a constant current source and the voltage of the LED (load) in the lighting device changes, the output power of the lighting device may also vary, which can lead to overload and potential device failure. Additionally, due to manufacturing tolerances, LEDs of the same model may have different power ratings, which could also result in the aforementioned issues. When the power supply for a lighting device is a constant voltage source and the LED (load) voltage varies significantly, which may cause the LED to fail to start or to experience overcurrent conditions, potentially leading to device failure. By contrast, according to one embodiment of the present invention, the lighting device includes a dimming module, a control module, a rectifier module and a light-emitting module. The control module is connected to the dimming module and saves a lookup table. The rectifier module is connected to the dimming module and the control module, and the rectifier module generates a rectified voltage to drive the dimming module and the control module. The light-emitting module is connected to the dimming module and the control module. The control module outputs an initial dimming signal to control the dimming module to output an initial drive signal so as to drive the light-emitting module. The control module detects the current operating voltage of the light-emitting module, and compares the current operating voltage with the lookup table to generate a target dimming signal corresponding thereto, such that the dimming module is controlled by the target dimming signal to generate a target driving signal to drive the light-emitting module. In this way, the output power of the light-emitting module can be constant. Via the adaptive output power control function, the control module can quickly and accurately estimate the current operating voltage (load voltage) of the light-emitting module and convert the current operating voltage into the target dimming signal via the lookup table to appropriately adjust the dimming module's dimming signal. In this way, the output power of the light-emitting module can remain constant in order to prevent overloads or faults in the lighting device. Thus, the reliability of the lighting device can be significantly improved to meet actual needs.

According to one embodiment of the present invention, the lighting device has the adaptive output power control function to maintain a constant output power in the dimming module. Therefore, even when the voltage of the light-emitting module (load) in the lighting device varies greatly, the adaptive output power control function can still keep the output power of the light-emitting module constant, ensuring that the light-emitting module can operate and effectively prevent overcurrent conditions. This further enhances the reliability of the lighting device to meet actual needs.

Also, according to one embodiment of the present invention, the lighting device includes a load voltage detection module. The control module includes a voltage detection unit, while the dimming module includes an output voltage extraction unit. The output voltage extraction unit converts the output voltage of the dimming module into a reference voltage based on a preset conversion ratio. The load voltage detection module receives the reference voltage and transmits the reference voltage to the control module, while the voltage detection unit receives the reference voltage and converts the reference voltage into a feedback signal according to a preset voltage division ratio. In this way, the control module can quickly compare the feedback signal with the lookup table to accurately estimate the output voltage of the dimming module and generate an estimated voltage. Finally, the control module can directly use the lookup table to find the target dimming signal corresponding to the estimated voltage, adjusting the output signal of the dimming module to generate the target driving signal. This specialized load voltage detection mechanism is compatible with different loads and can quickly and efficiently detect load voltage, such that the output current of the dimming module can vary with the estimated voltage. Therefore, the output power of the light-emitting module can remain constant.

Further, according to one embodiment of the present invention, the control module can generate the target dimming signal by smoothly adjusting the duty cycle. This control mechanism effectively prevents damage to the light-emitting module caused by rapid voltage changes, thus extending the service life of the light-emitting module and meeting environmental protection requirements.

Moreover, according to one embodiment of the present invention, the lighting device has the adaptive output power control function to maintain a constant output power in the dimming module. Therefore, even if the light-emitting module's electrical characteristics deviate from the specified parameters due to manufacturing variations, the adaptive output power control function can still keep the output power of the light-emitting module within the specified parameters. This effectively optimizes the performance of the lighting device.

Furthermore, according to one embodiment of the present invention, the circuit design of the lighting device is simple, such that the lighting device can achieve the desired technical effects without significantly increasing costs. Thus, the practicality of the lighting device is effectively improved to meet the needs of different applications. Therefore, the lighting device according to the embodiments of the present invention can achieve great technical effects.

Figure 4:
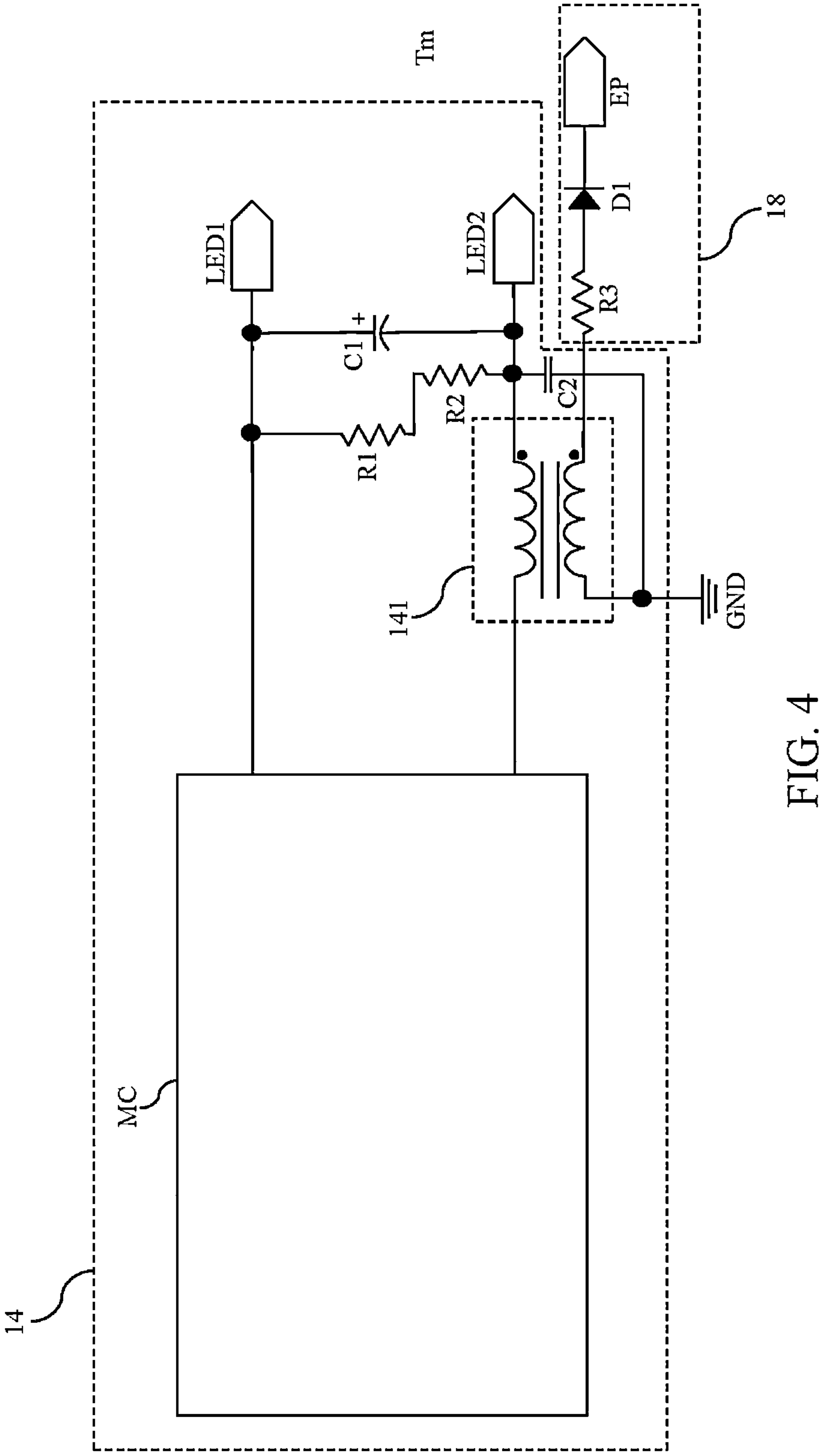
FIG. 4 is the circuit diagram of the dimming module and the load voltage detection module of the lighting device with adaptive output power control function in accordance with the second embodiment of the present invention.

Please refer to FIG. 4, which is the circuit diagram of the dimming module and the load voltage detection module of the lighting device with adaptive output power control function in accordance with the second embodiment of the present invention, and also refer to FIG. 1 to FIG. 3. As shown in FIG. 4, the dimming module 14 includes a main control circuit MC (which includes a control chip and other necessary electronic components) and an output terminal. The output terminal includes a resistor R1, a resistor R2, a capacitor C1, a capacitor C2, a first terminal LED1, a second terminal LED2, and an output voltage extraction unit 141.

The first terminal LED1 and the second terminal LED2 are connected to the light-emitting module 15.

The main control circuit MC is connected to the first terminal LED1 and the second terminal LED2. The two ends of the capacitor C1 are connected to the first terminal LED1 and the second terminal LED2, respectively. The resistor R1 and the resistor R2 are connected in series to form a serial circuit, and this serial circuit is connected in parallel with capacitor C1.

As previously mentioned, the primary side of the output voltage extraction unit 141 (a transformer in this embodiment) is connected to the second terminal LED2. The secondary side of the output voltage extraction unit 141 is connected to the ground GND and is connected to the second terminal LED2 through the capacitor C2. The output voltage extraction unit 141 converts the output voltage of the dimming module 14 into the reference voltage Vr according to a preset conversion ratio (turns ratio).

The load voltage detection module 18 includes a resistor R3, a diode D1, and a reference voltage output terminal EP, connected in series. The load voltage detection module 18 receives the reference voltage Vr from the secondary side of the output voltage extraction unit 141 and outputs the reference voltage Vr via the reference voltage output terminal EP.

The embodiment just exemplifies the present invention and is not intended to limit the scope of the present invention; any equivalent modification and variation according to the spirit of the present invention is to be also included within the scope of the following claims and their equivalents.

Figure 5:
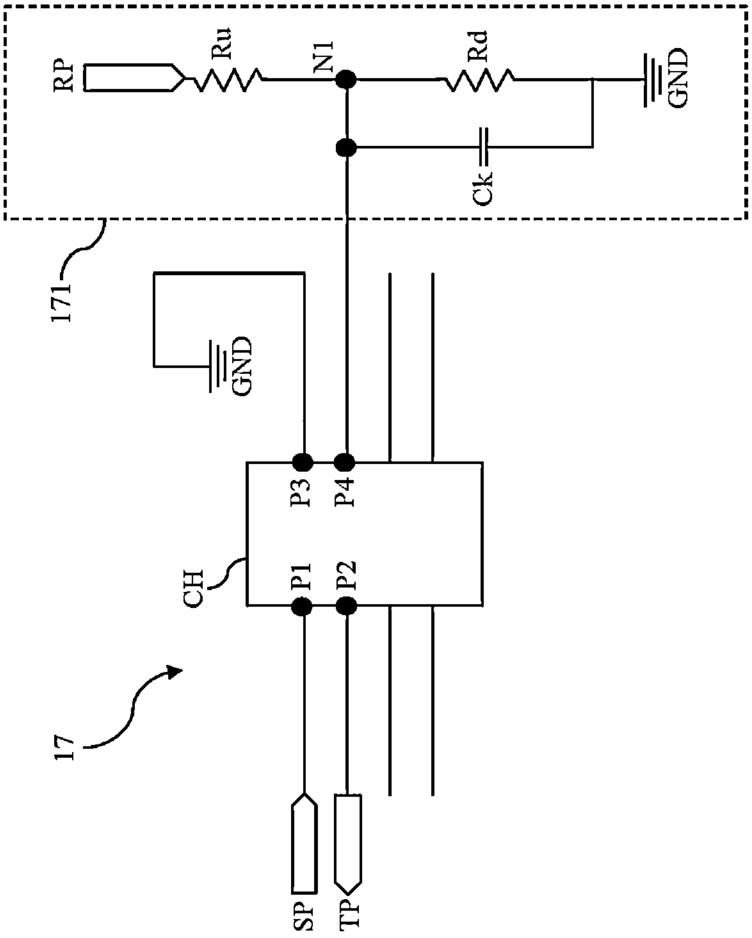
FIG. 5 is the circuit diagram of the control module of the lighting device with adaptive output power control function in accordance with the second embodiment of the present invention.

Please refer to FIG. 5, which is the circuit diagram of the control module of the lighting device with adaptive output power control function in accordance with the second embodiment of the present invention, and also refer to FIG. 1 to FIG. 3. As shown in FIG. 5, the control module 17 includes a control chip CH, an operating voltage input terminal SP, a dimming signal output terminal TP, and a voltage detection unit 171.

The control chip CH includes a first pin P1, a second pin P2, a third pin P3, and a fourth pin P4. The first pin P1 is connected to the operating voltage input terminal SP, which is connected to the power supply module 16. The second pin P2 is connected to the dimming signal output terminal TP. The third pin P3 is connected to the ground GND. The fourth pin P4 is connected to the voltage detection unit 171. The voltage detection unit 171 includes a first voltage divider resistor Ru, a second voltage divider resistor Rd, a capacitor Ck, and a reference voltage receiving terminal RP. The two ends of the first voltage divider resistor Ru are connected to the reference voltage receiving terminal RP and the first node N1, respectively. The two ends of the second voltage divider resistor Rd are connected to the first node N1 and the ground GND, respectively. The capacitor Ck is connected in parallel with the second voltage divider resistor Rd.

As previously mentioned, the voltage detection unit 171 converts the reference voltage Vr into a feedback signal Fs according to the preset voltage division ratio of the voltage divider circuit composed of the first voltage divider resistor Ru and the second voltage divider resistor Rd. The control chip CH compares the feedback signal Fs with the lookup table to estimate the output voltage of the dimming module 14 and generates an estimated voltage Ve. Based on the estimated voltage Ve, the control chip CH generates the target dimming signal Gs. The control chip CH then outputs the target dimming signal Gs via the dimming signal output terminal TP.

The embodiment just exemplifies the present invention and is not intended to limit the scope of the present invention; any equivalent modification and variation according to the spirit of the present invention is to be also included within the scope of the following claims and their equivalents.

Figure 6:
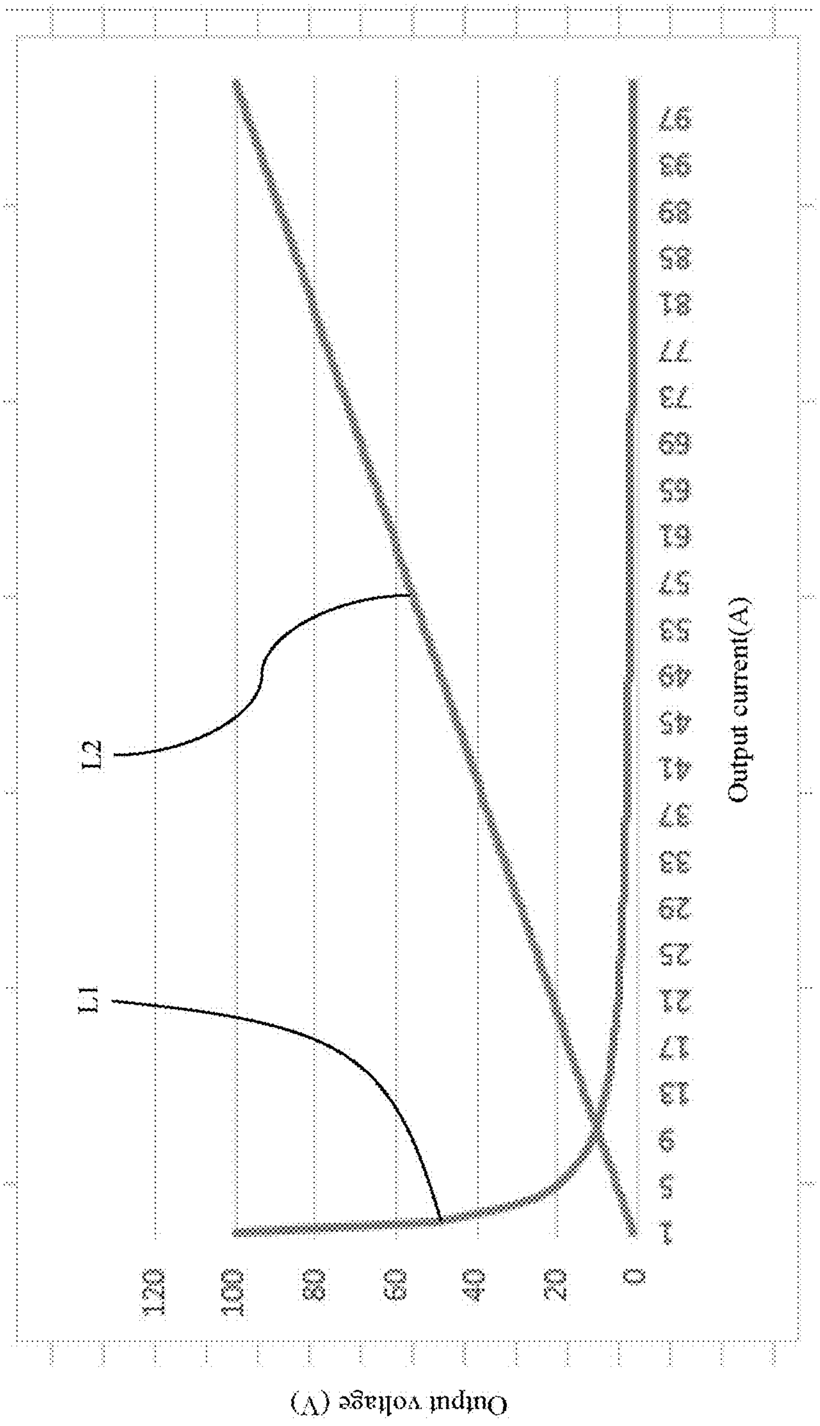
FIG. 6 is the voltage/current graph of the operating state of the lighting device with adaptive output power control function in accordance with the first embodiment of the present invention.

Please refer to FIG. 6, which is the voltage/current graph of the operating state of the lighting device with adaptive output power control function in accordance with the first embodiment of the present invention, and also refer to FIG. 1 to FIG. 3. As shown in FIG. 6, the curve L1 stands for the output voltage, and the curve L2 stands for the output current. The lookup table records the output current corresponding to different output voltages of the dimming module 14, and the duty cycle of the control signal corresponding to different output currents. Therefore, the control module 17 can compare the feedback signal Fs with the lookup table to estimate the output voltage of the dimming module 14, generate an estimated voltage Ve, and based on the estimated voltage Ve, generate the target dimming signal Gs. The control module 17 then transmits the target dimming signal Gs to the dimming module 14 to control the dimming module 14 to generate the target driving signal As and drive the light-emitting module 15. Through this mechanism, the control module 17 can quickly and accurately estimate the current operating voltage (load voltage) of the light-emitting module 15 and convert the current operating voltage to the target dimming signal Gs using the lookup table to appropriately adjust the dimming signal of the dimming module 14. Thus, the output power of the light-emitting module 15 can remain constant.

As described above, the lighting device 1 includes the load voltage detection module 18. The control module 17 includes the voltage detection unit 171, and the dimming module 14 includes the output voltage extraction unit 141. The output voltage extraction unit 141 converts the output voltage of the dimming module 14 into the reference voltage Vr according to a preset conversion ratio. The load voltage detection module 18 receives the reference voltage Vr and sends the reference voltage Vr to the control module 17, while the voltage detection unit 171 receives the reference voltage Vr and converts the reference voltage Vr into the feedback signal Fs according to a preset voltage division ratio. In this way, the control module 17 can quickly compare the feedback signal Fs with the lookup table to accurately estimate the output voltage of the dimming module 14 and generate the estimated voltage Ve. Finally, the control module 17 can directly use the lookup table to find the target dimming signal Gs corresponding to the estimated voltage Ve to adjust the output signal of the dimming module 14, causing the dimming module 14 to generate the target driving signal As. This specific load voltage detection mechanism is compatible with different loads and can quickly and efficiently detect the load voltage, such that the output current of the dimming module 14 can vary with the estimated output voltage Ve. Therefore, the output power of the light-emitting module 15 can remain constant.

Through the adaptive output power control function described above, the control module 17 can quickly and accurately estimate the current operating voltage (load voltage) of the light-emitting module 15 and convert the current operating voltage to the target dimming signal Gs using the lookup table to appropriately adjust the dimming signal of the dimming module 14. Thus, the output power of the light-emitting module 15 can remain constant, preventing overload or malfunction of the lighting device 1. Additionally, the adaptive output power control function maintains constant output power of the light-emitting module 15, ensuring that the light-emitting module 15 can start up and effectively prevent overcurrent situations. Consequently, the reliability of the lighting device 1 can be greatly enhanced, meeting practical application requirements.

Furthermore, the lighting device 1 has an adaptive output power control function, which ensures that the output power of the dimming module 14 remains constant. Therefore, even if the light-emitting module 15 deviates from its specified electrical characteristics due to manufacturing tolerances, the adaptive output power control function still allows the output power of the light-emitting module 15 to meet the specified requirements. Thus, the performance of the lighting device 1 can be effectively optimized.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a dimming module, a control module, a rectifier module and a light-emitting module. The control module is connected to the dimming module and saves a lookup table. The rectifier module is connected to the dimming module and the control module, and the rectifier module generates a rectified voltage to drive the dimming module and the control module. The light-emitting module is connected to the dimming module and the control module. The control module outputs an initial dimming signal to control the dimming module to output an initial drive signal so as to drive the light-emitting module. The control module detects the current operating voltage of the light-emitting module, and compares the current operating voltage with the lookup table to generate a target dimming signal corresponding thereto, such that the dimming module is controlled by the target dimming signal to generate a target driving signal to drive the light-emitting module. In this way, the output power of the light-emitting module can be constant. Via the adaptive output power control function, the control module can quickly and accurately estimate the current operating voltage (load voltage) of the light-emitting module and convert the current operating voltage into the target dimming signal via the lookup table to appropriately adjust the dimming module's dimming signal. In this way, the output power of the light-emitting module can remain constant in order to prevent overloads or faults in the lighting device. Thus, the reliability of the lighting device can be significantly improved to meet actual needs.

According to one embodiment of the present invention, the lighting device has the adaptive output power control function to maintain a constant output power in the dimming module. Therefore, even when the voltage of the light-emitting module (load) in the lighting device varies greatly, the adaptive output power control function can still keep the output power of the light-emitting module constant, ensuring that the light-emitting module can operate and effectively prevent overcurrent conditions. This further enhances the reliability of the lighting device to meet actual needs.

Also, according to one embodiment of the present invention, the lighting device includes a load voltage detection module. The control module includes a voltage detection unit, while the dimming module includes an output voltage extraction unit. The output voltage extraction unit converts the output voltage of the dimming module into a reference voltage based on a preset conversion ratio. The load voltage detection module receives the reference voltage and transmits the reference voltage to the control module, while the voltage detection unit receives the reference voltage and converts the reference voltage into a feedback signal according to a preset voltage division ratio. In this way, the control module can quickly compare the feedback signal with the lookup table to accurately estimate the output voltage of the dimming module and generate an estimated voltage. Finally, the control module can directly use the lookup table to find the target dimming signal corresponding to the estimated voltage, adjusting the output signal of the dimming module to generate the target driving signal. This specialized load voltage detection mechanism is compatible with different loads and can quickly and efficiently detect load voltage, such that the output current of the dimming module can vary with the estimated voltage. Therefore, the output power of the light-emitting module can remain constant.

Further, according to one embodiment of the present invention, the control module can generate the target dimming signal by smoothly adjusting the duty cycle. This control mechanism effectively prevents damage to the light-emitting module caused by rapid voltage changes, thus extending the service life of the light-emitting module and meeting environmental protection requirements.

Moreover, according to one embodiment of the present invention, the lighting device has the adaptive output power control function to maintain a constant output power in the dimming module. Therefore, even if the light-emitting module's electrical characteristics deviate from the specified parameters due to manufacturing variations, the adaptive output power control function can still keep the output power of the light-emitting module within the specified parameters. This effectively optimizes the performance of the lighting device.

Furthermore, according to one embodiment of the present invention, the circuit design of the lighting device is simple, such that the lighting device can achieve the desired technical effects without significantly increasing costs. Thus, the practicality of the lighting device is effectively improved to meet the needs of different applications.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device with adaptive output power control function, comprising:
- a dimming module;
- a control module connected to the dimming module and configured to save a lookup table;
- a rectifier module connected to the dimming module and the control module, and configured to generate a rectified voltage to drive the dimming module and the control module; and
- a light-emitting module connected to the dimming module and the control module;
- wherein the control module is configured to output an initial dimming signal to control the dimming module to output an initial drive signal so as to drive the light-emitting module, and the control module detects a current operating voltage of the light-emitting module, and compares the current operating voltage with the lookup table to generate a target dimming signal corresponding thereto, whereby the dimming module is controlled by the target dimming signal to generate a target driving signal to drive the light-emitting module.

2. The lighting device with adaptive output power control function as claimed in claim 1, wherein the dimming module comprises an output voltage extraction unit configured to convert an output voltage of the dimming module into a reference voltage based on a preset conversion ratio.

3. The lighting device with adaptive output power control function as claimed in claim 2, further comprising a load voltage detection module configured to receive the reference voltage and transmit the reference voltage to the control module.

4. The lighting device with adaptive output power control function as claimed in claim 3, wherein the control module comprises a voltage detection unit configured to receive the reference voltage and convert the reference voltage into a feedback signal based on a preset voltage division ratio, wherein the control module is configured to compare the feedback signal with the lookup table to estimate the output voltage of the dimming module and generate an estimated voltage, and generate the target dimming signal according to the estimated voltage in order to make an output power of the light-emitting module be constant.

5. The lighting device with adaptive output power control function as claimed in claim 4, wherein the lookup table is configured to record the preset conversion ratio and the preset voltage division ratio.

6. The lighting device with adaptive output power control function as claimed in claim 2, wherein the output voltage extraction unit is a transformer.

7. The lighting device with adaptive output power control function as claimed in claim 1, wherein the control module is configured to periodically generate the target dimming signal to control the dimming module to generate the target driving signal so as to drive the light-emitting module.

8. The lighting device with adaptive output power control function as claimed in claim 1, further comprising a filter module connected to an external power source and the rectifier module.

9. The lighting device with adaptive output power control function as claimed in claim 1, further comprising a power factor correction module, wherein the rectifier module is connected to the dimming module via the power factor correction module.

10. The lighting device with adaptive output power control function as claimed in claim 1, further comprising a power supply module, wherein the rectifier module is connected to the control module via the power supply module.

* * * * *